United States Patent
Seeboth et al.

(10) Patent No.: US 10,961,371 B2
(45) Date of Patent: Mar. 30, 2021

(54) RUBBER COMPOSITION COMPRISING A MONOHYDROXYSILANE POLYSULFIDE COUPLING AGENT

(71) Applicant: COMPAGNIE GENERALE DES ETABLISSEMENTS MICHELIN, Clermont-Ferrand (FR)

(72) Inventors: Nicolas Seeboth, Clermont-Ferrand (FR); Anne-Frédérique Salit, Clermont-Ferrand (FR); Sylvain Mayer, Clermont-Ferrand (FR); José Manuel Antelo Miguez, Santiago de Compostela (ES); Pablo Barreiro, Vigo (ES); Benigno A. Janeiro, San-Miguel de Presqueira (ES)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 68 days.

(21) Appl. No.: 16/314,135

(22) PCT Filed: Jun. 29, 2017

(86) PCT No.: PCT/FR2017/051747
§ 371 (c)(1),
(2) Date: Dec. 28, 2018

(87) PCT Pub. No.: WO2018/002536
PCT Pub. Date: Jan. 4, 2018

(65) Prior Publication Data
US 2019/0233618 A1    Aug. 1, 2019

(30) Foreign Application Priority Data

Jun. 30, 2016 (FR) ...................... 1656271

(51) Int. Cl.
*C07F 7/18*        (2006.01)
*C07F 7/08*        (2006.01)
*B60C 1/00*        (2006.01)
*C08F 236/06*      (2006.01)
*C08K 5/5419*      (2006.01)
*C08K 5/372*       (2006.01)
*C08L 9/00*        (2006.01)
*C08J 3/24*        (2006.01)
*C08L 9/06*        (2006.01)
*C08L 7/00*        (2006.01)
*C08F 236/06*      (2006.01)
*C08F 36/08*       (2006.01)

(52) U.S. Cl.
CPC .............. *C08K 5/5419* (2013.01); *B60C 1/00* (2013.01); *B60C 1/0016* (2013.01); *C07F 7/0836* (2013.01); *C08F 36/06* (2013.01); *C08F 36/08* (2013.01); *C08L 7/00* (2013.01); *C08L 9/00* (2013.01); *C08L 9/06* (2013.01); *C07F 7/081* (2013.01); *C07F 7/1804* (2013.01); *C08F 236/06* (2013.01); *C08F 2810/20* (2013.01); *C08J 3/24* (2013.01); *C08J 2309/00* (2013.01); *C08K 5/372* (2013.01); *C08L 2666/44* (2013.01)

(58) Field of Classification Search
CPC ....... C08K 5/372; B60C 1/0016; C07F 7/081; C07F 36/06; C07F 36/08; C07F 136/06; C07F 136/08; C08F 236/06; C08F 236/08; C08F 236/10; C08F 236/12; C08L 7/00–02; C08L 9/00–10
See application file for complete search history.

(56) References Cited

U.S. PATENT DOCUMENTS

| | | |
|---|---|---|
| 4,595,740 A | 6/1986 | Panster |
| 5,227,425 A | 7/1993 | Rauline |
| 5,534,592 A | 7/1996 | Halasa et al. |
| 5,852,099 A | 12/1998 | Vanel |
| 5,900,449 A | 5/1999 | Custodero et al. |
| 5,977,238 A | 11/1999 | Labauze |
| 6,013,718 A | 1/2000 | Cabioch et al. |
| 6,156,822 A | 12/2000 | Mateme et al. |

(Continued)

FOREIGN PATENT DOCUMENTS

| | | |
|---|---|---|
| CN | 1474824 A | 2/2004 |
| CN | 1478125 A | 2/2004 |

(Continued)

OTHER PUBLICATIONS

International Search Report dated Sep. 14, 2017, in corresponding PCT/FR2017/051747 (7 pages).
S. Brunauer, et al., "Adsorption of Gases in Multimolecular Layers", J. Am. Chem. Soc., vol. 60, pp. 309-319 (1938).

(Continued)

*Primary Examiner* — Richard A Huhn
(74) *Attorney, Agent, or Firm* — Venable LLP

(57) ABSTRACT

An elastomeric composition is based on at least a diene elastomer, an inorganic filler as reinforcing filler and a monohydroxysilane polysulfide as coupling agent of formula (I): $(HO)(R^1)_2Si-CH_2-(R^2)CH-Z-S_x-Z-HC(R_2)-CH_2-Si(R^1)_2(OH)$ (I), in which: each $R^1$ represents a monovalent hydrocarbon group having from 1 to 18 carbon atoms and can be the same or different from one another; each $R^2$ represents a monovalent hydrocarbon group having from 1 to 4 carbon atoms and can be the same or different from one another; each Z represents a divalent hydrocarbon bonding group comprising from 1 to 16 carbon atoms can be the same or different from one another; and x is an integral or fractional number greater than or equal to 2.

18 Claims, No Drawings

(56) References Cited

U.S. PATENT DOCUMENTS

| | | |
|---|---|---|
| 6,191,205 B1 | 2/2001 | Micouin et al. |
| 6,313,205 B1 | 11/2001 | Chiron et al. |
| 6,344,506 B2 | 2/2002 | Vasseur |
| 6,420,488 B1 | 7/2002 | Penot |
| 6,503,973 B2 | 1/2003 | Robert et al. |
| 6,536,492 B2 | 3/2003 | Vasseur |
| 6,747,087 B2 | 6/2004 | Custodero et al. |
| 6,765,045 B1 | 7/2004 | Daniel et al. |
| 6,774,255 B1 | 8/2004 | Tardivat et al. |
| 6,815,473 B2 | 11/2004 | Robert et al. |
| 6,835,769 B2 | 12/2004 | Custodero et al. |
| 6,890,981 B1 | 5/2005 | Luginsland |
| 7,135,517 B2 | 11/2006 | Simonot et al. |
| 7,199,175 B2 | 4/2007 | Vasseur |
| 7,202,295 B2 | 4/2007 | Simonot et al. |
| 7,256,233 B2 | 8/2007 | Simonot et al. |
| 7,312,264 B2 | 12/2007 | Gandon-Pain |
| 7,425,313 B2 | 9/2008 | Custodero et al. |
| 7,488,768 B2 | 2/2009 | Tardivat et al. |
| 7,659,417 B2 | 2/2010 | Guennouni et al. |
| 7,820,771 B2 | 10/2010 | Lapra et al. |
| 7,900,667 B2 | 3/2011 | Vasseur |
| 8,344,063 B2 | 1/2013 | Marechal et al. |
| 8,394,903 B2 | 3/2013 | Marechal |
| 8,455,584 B2 | 6/2013 | Robert et al. |
| 8,492,479 B2 | 7/2013 | Robert et al. |
| 9,303,148 B2 | 4/2016 | Cambon et al. |
| 2001/0034389 A1 | 10/2001 | Vasseur |
| 2001/0036991 A1 | 11/2001 | Robert et al. |
| 2001/0039308 A1 | 11/2001 | Custodero et al. |
| 2001/0056138 A1 | 12/2001 | Vasseur |
| 2002/0004549 A1 | 1/2002 | Custodero et al. |
| 2002/0183436 A1 | 12/2002 | Robert et al. |
| 2003/0202923 A1 | 10/2003 | Custodero et al. |
| 2003/0212185 A1 | 11/2003 | Vasseur |
| 2004/0030017 A1 | 2/2004 | Simonot et al. |
| 2004/0051210 A1* | 3/2004 | Tardivat ............... B60C 1/0016 264/349 |
| 2005/0171264 A1 | 8/2005 | Simonot et al. |
| 2006/0009564 A1 | 1/2006 | Simonot et al. |
| 2006/0089445 A1 | 4/2006 | Gandon-Pain |
| 2007/0112120 A1 | 5/2007 | Vasseur |
| 2008/0132644 A1 | 6/2008 | Lapra et al. |
| 2009/0131572 A1 | 5/2009 | Cambon et al. |
| 2009/0270558 A1 | 10/2009 | Gandon-pain et al. |
| 2010/0184912 A1 | 7/2010 | Marechal et al. |
| 2010/0216935 A1 | 8/2010 | Boswell et al. |
| 2010/0249270 A1 | 9/2010 | Robert et al. |
| 2010/0252156 A1 | 10/2010 | Robert et al. |
| 2011/0251354 A1 | 10/2011 | Marechal |
| 2011/0319646 A1 | 12/2011 | Boswell et al. |
| 2018/0282525 A1 | 10/2018 | Sato et al. |
| 2019/0359791 A1 | 11/2019 | Seeboth et al. |

FOREIGN PATENT DOCUMENTS

| | | |
|---|---|---|
| CN | 1993416 A | 7/2007 |
| CN | 101331141 A | 12/2008 |
| EP | 0098947 A1 | 1/1984 |
| EP | 0501227 A1 | 9/1992 |
| EP | 0669338 A1 | 8/1995 |
| EP | 0735088 A1 | 10/1996 |
| EP | 0810258 A1 | 12/1997 |
| EP | 0881252 A1 | 12/1998 |
| EP | 1002836 A1 | 5/2000 |
| EP | 1043357 A1 | 10/2000 |
| EP | 1127909 A1 | 8/2001 |
| EP | 1326871 | 7/2003 |
| EP | 1 326 914 B1 | 6/2006 |
| FR | 2094859 | 2/1972 |
| FR | 2740778 | 5/1997 |
| FR | 2765882 | 1/1999 |
| GB | 1310379 | 3/1973 |
| WO | 97/36724 A2 | 10/1997 |
| WO | 99/02590 A1 | 1/1999 |
| WO | 99/02601 A1 | 1/1999 |
| WO | 99/02602 A1 | 1/1999 |
| WO | 99/16600 A1 | 4/1999 |
| WO | 99/28376 A1 | 6/1999 |
| WO | 00/05300 A1 | 2/2000 |
| WO | 00/05301 A1 | 2/2000 |
| WO | 00/53671 A1 | 9/2000 |
| WO | 00/73372 A1 | 12/2000 |
| WO | 00/73373 A1 | 12/2000 |
| WO | 01/92402 A1 | 12/2001 |
| WO | 02/10269 A2 | 2/2002 |
| WO | 02/053634 A1 | 7/2002 |
| WO | 2004003067 A1 | 1/2004 |
| WO | 2004/056915 A1 | 7/2004 |
| WO | 2004/096865 A2 | 11/2004 |
| WO | 2005/118598 A1 | 12/2005 |
| WO | 2006/013056 A1 | 2/2006 |
| WO | 2006/069792 A1 | 7/2006 |
| WO | 2006/069793 A1 | 7/2006 |
| WO | 2008/141702 A1 | 11/2008 |
| WO | 2009/000750 A1 | 12/2008 |
| WO | 2009/000752 A1 | 12/2008 |
| WO | 2010/072761 A1 | 7/2010 |
| WO | 2017/033815 A1 | 3/2017 |

OTHER PUBLICATIONS

R. Mildenberg, et al., Hydrocarbon Resins, VCH, New York, chapter 5 (1997).

* cited by examiner

RUBBER COMPOSITION COMPRISING A MONOHYDROXYSILANE POLYSULFIDE COUPLING AGENT

BACKGROUND

The present invention relates to diene elastomer compositions reinforced with an inorganic filler which can be used in the manufacture of tyres or of semi-finished products for tyres, in particular of treads of these tyres.

It relates in particular to the coupling agents which can be used for the coupling of reinforcing inorganic fillers and of diene elastomers in such elastomeric compositions.

It is known that, generally, in order to obtain the optimum reinforcing properties conferred by a filler, it is advisable for the latter to be present in the elastomeric matrix in a final form which is both as finely divided as possible and as homogeneously distributed as possible. In point of fact, such conditions can only be achieved in so far as the filler exhibits a very good ability, on the one hand, to be incorporated in the matrix during the mixing with the elastomer and to deagglomerate and, on the other hand, to disperse homogeneously in this matrix.

In an entirely known way, carbon black exhibits such abilities, which is not generally the case with inorganic fillers. This is because, for reciprocal affinity reasons, the inorganic filler particles have an unfortunate tendency to clump together in the elastomeric matrix. These interactions have the harmful consequence of limiting the dispersion of the filler and thus the reinforcing properties to a level substantially lower than that which it would be theoretically possible to achieve if all the (inorganic filler/elastomer) bonds capable of being created during the compounding operation were actually obtained. These interactions moreover tend to increase the consistency in the raw state of the rubber compositions and thus to make them more difficult to process than in the presence of carbon black.

Since fuel savings and the need to protect the environment have become a priority, it has, however, proved necessary to produce tyres having a reduced rolling resistance, without adversely affecting their wear resistance. This has been made possible in particular by virtue of the discovery of novel rubber compositions reinforced with specific inorganic fillers described as "reinforcing" which are capable of rivalling, from the reinforcing viewpoint, a conventional tyre-grade carbon black, while offering these compositions a lower hysteresis, which is synonymous with a lower rolling resistance for the tyres comprising them.

Such rubber compositions, comprising reinforcing inorganic fillers of siliceous or aluminous type, have, for example, been described in Patents or Patent Applications EP-A-0 501 227 (or U.S. Pat. No. 5,227,425), EP-A-0 735 088 (or U.S. Pat. No. 5,852,099), EP-A-0 810 258 (or U.S. Pat. No. 5,900,449), EP-A-0 881 252, WO99/02590, WO99/02601, WO99/02602, WO99/28376, WO00/05300 or WO00/05301.

Mention will in particular be made of the documents EP-A-0 501 227, EP-A-0 735 088 or EP-A-0 881 252, which disclose diene rubber compositions reinforced with highly dispersible precipitated silicas, such compositions making it possible to manufacture treads having a markedly improved rolling resistance, without affecting the other properties, in particular those of grip, endurance and wear resistance. Such compositions, exhibiting such a compromise in conflicting properties, are also described in Applications EP-A-0 810 258 and WO99/28376 with, as reinforcing inorganic fillers, specific highly-dispersible aluminous fillers (aluminas or aluminium (oxide) hydroxides), or also in Applications WO00/73372 and WO00/73373, which describe specific titanium oxides of the reinforcing type.

The use of these specific highly dispersible inorganic fillers, as predominant or non-predominant reinforcing filler, has admittedly reduced the difficulties in processing the rubber compositions comprising them but this processing nevertheless remains more difficult than for the rubber compositions conventionally comprising carbon black as filler.

In particular, it is necessary to use a coupling agent, also known as bonding agent, which has the role of providing the bonding between the surface of the inorganic filler particles and the elastomer, while facilitating the dispersion of this inorganic filler within the elastomeric matrix.

It should be remembered here that the term "coupling agent" (inorganic filler/elastomer) has to be understood as meaning, in a known way, an agent capable of establishing a satisfactory bond, of chemical and/or physical nature, between the inorganic filler and the diene elastomer; such an at least bifunctional coupling agent has, for example, the simplified general formula "Y—W—X", in which:

- Y represents a functional group ("Y" functional group) which is capable of being bonded physically and/or chemically to the inorganic filler, it being possible for such a bond to be established, for example, between a silicon atom of the coupling agent and the surface hydroxyl (OH) groups of the inorganic filler (for example the surface silanols, when silica is concerned);
- X represents a functional group ("X" functional group) which is capable of being bonded physically and/or chemically to the diene elastomer, for example via a sulfur atom;
- W represents a divalent group which makes it possible to connect Y and X.

The coupling agents should in particular not be confused with simple covering agents for inorganic filler which, in a known way, can comprise the Y functional group, active with regard to the inorganic filler, but are devoid of the X functional group, active with regard to the diene elastomer.

Coupling agents, in particular silica/diene elastomer coupling agents, have been described in a large number of documents, the most well-known being bifunctional organosilanes bearing at least one alkoxyl functional group as Y functional group and, as X functional group, at least one functional group capable of reacting with the diene elastomer, such as, for example, a sulfur-comprising functional group.

The Applicant Company has described, in its Patent EP 1 326871, novel hydroxysilane coupling agents capable of overcoming the disadvantages of the mercaptosilane coupling agents as described in the publications FR-A-2 094 859 and GB-A-1 310 379, which bring about, for the compositions including them, problems of premature vulcanization, also known as "scorching", and of excessive viscosity in the raw state. These novel hydroxysilane coupling agents also make it possible to overcome the disadvantages of alkoxysilane polysulfide coupling agents, as described in particular in the publications EP-A-1 043 357 and WO00/53671, especially TESPT (bis(3-triethoxysilyl-propyl) tetrasulfide), which sort out the abovementioned disadvantages, but exhibit, however, the disadvantage of substantially slowing down the kinetics of vulcanization of the rubber compositions containing them, in comparison with that of the conventional compositions reinforced with carbon black.

The Applicant Company has thus continued these research studies and, after many years of research, has discovered that a specific functionalization of the coupling agent makes it possible to retain the rubber composition properties obtained with the 1st generation of abovementioned hydroxysilane coupling agents but also, surprisingly, that these novel coupling agents make it possible to improve the reinforcing and stiffness properties conferred on rubber compositions including them.

Advantageously, these improved properties are also improved in the absence of zinc oxide, which it is desired, for environmental reasons, to reduce, indeed even eliminate.

SUMMARY

A subject-matter of the invention is thus an elastomeric composition based on at least a diene elastomer, an inorganic filler as reinforcing filler and a monohydroxysilane polysulfide as coupling agent, of formula (I):

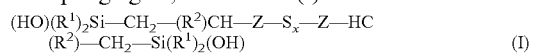
(HO)(R$^1$)$_2$Si—CH$_2$—(R$^2$)CH—Z—S$_x$—Z—HC
(R$^2$)—CH$_2$—Si(R$^1$)$_2$(OH)  (I)

in which:
- R$^1$, which are identical or different, each represent a monovalent hydrocarbon group having from 1 to 18 carbon atoms;
- R$^2$, which are identical or different, each represent a monovalent hydrocarbon group having from 1 to 4 carbon atoms;
- Z, which are identical or different, each represent a divalent hydrocarbon bonding group comprising from 1 to 16 carbon atoms;
- x is an integral or fractional number greater than or equal to 2.

According to an advantageous characteristic of the invention, the R$^1$ groups are chosen from C$_1$-C$_6$ alkyls, C$_5$-C$_8$ cycloalkyls and the phenyl radical, the Z groups being chosen from C$_1$-C$_{16}$ alkylenes and C$_6$-C$_{12}$ arylenes, and preferably the R$^1$ groups are chosen from C$_1$-C$_3$ alkyls, the Z groups being chosen from C$_1$-C$_3$ alkylenes.

Preferably, the monohydroxysilane polysulfide corresponds to the formula (Me=methyl):

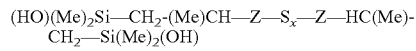
(HO)(Me)$_2$Si—CH$_2$-(Me)CH—Z—S$_x$—Z—HC(Me)-
CH$_2$—Si(Me)$_2$(OH)

More preferably, the Z groups are chosen from methylene and ethylene and more preferably still the coupling agent consists of a bis(2-methylpropane-1,3-diyl)(dimethylsilanol) polysulfide.

According to a preferred embodiment of the invention, x is within a range extending from 2 to 4.

According to another preferred characteristic of the invention, the diene elastomer is selected from the group consisting of polybutadienes, natural rubber, synthetic polyisoprenes, butadiene copolymers, isoprene copolymers and mixtures of these elastomers.

Preferably, the butadiene copolymers and those of isoprene are chosen from butadiene/styrene copolymers, butadiene/isoprene copolymers, isoprene/styrene copolymers, butadiene/acrylonitrile copolymers, butadiene/styrene/isoprene copolymers and the mixtures of these copolymers.

Another subject-matter of the invention is a tread, a finished or semi-finished article and a tyre comprising a composition as described above.

DETAILED DESCRIPTION

I. Measurements and Tests Used

The rubber compositions are characterized, before and after curing, as indicated below.

Tensile Tests

These tests make it possible to determine the elasticity stresses and the properties at break. Unless otherwise indicated, they are carried out in accordance with French Standard NF T 46-002 of September 1988. The nominal secant moduli (or apparent stresses, in MPa) are measured in second elongation (i.e. after an accommodation cycle at the extension rate provided for the measurement itself) at 10% elongation (denoted M10), 100% elongation (denoted M100) and 300% elongation (denoted M300). The breaking stresses (in MPa) and the elongations at break (in %) are also measured. All these tensile measurements are carried out under the standard conditions of temperature and hygrometry according to French Standard NF T 40-101 (December 1979).

II. Detailed Description of the Invention

The rubber compositions according to the invention are based on at least a diene elastomer, an inorganic filler as reinforcing filler and a monohydroxysilane polysulfide as coupling agent, of formula (I):

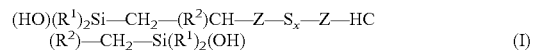
(HO)(R$^1$)$_2$Si—CH$_2$—(R$^2$)CH—Z—S$_x$—Z—HC
(R$^2$)—CH$_2$—Si(R$^1$)$_2$(OH)  (I)

in which:
- R$^1$, which are identical or different, each represent a monovalent hydrocarbon group having from 1 to 18 carbon atoms;
- R$^2$, which are identical or different, each represent a monovalent hydrocarbon group having from 1 to 4 carbon atoms;
- Z, which are identical or different, each represent a divalent hydrocarbon bonding group comprising from 1 to 16 carbon atoms;
- x is an integral or fractional number greater than or equal to 2.

The expression composition "based on" should be understood as meaning a composition comprising the mixture and/or the reaction product of the various constituents used, some of these base constituents being capable of reacting, or intended to react, with one another, at least in part, during the various phases of manufacture of the composition, in particular during the crosslinking or vulcanization thereof.

In the present description, unless expressly indicated otherwise, all the percentages (%) shown are percentages (%) by weight. Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

It should be noted that the compounds mentioned below and participating in the preparation of rubber compositions can be of fossil or biosourced origin. In the latter case, they may partially or completely result from biomass or be obtained from renewable starting materials resulting from biomass. Polymers, plasticizers, fillers, and the like, are concerned in particular.

Diene Elastomer

The composition in accordance with the invention comprises at least one diene elastomer.

"Diene" elastomer (or without distinction rubber), whether natural or synthetic, should be understood, in a known way, as meaning an elastomer composed, at least in part (i.e., a homopolymer or a copolymer), of diene monomer units (monomers bearing two conjugated or non-conjugated carbon-carbon double bonds).

These diene elastomers can be classified into two categories: "essentially unsaturated" or "essentially saturated". "Essentially unsaturated" is understood to mean generally a diene elastomer resulting at least in part from conjugated diene monomers having a content of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low content, always less than 15%, of units of diene origin). In the category of "essentially unsaturated" diene elastomers, a "highly unsaturated" diene elastomer is understood in particular to mean a diene elastomer having a content of units of diene origin (conjugated dienes) which is greater than 50%.

Given these definitions, diene elastomer capable of being used in the compositions in accordance with the invention is understood more particularly to mean:

(a)—any homopolymer of a conjugated diene monomer, in particular any homopolymer obtained by polymerization of a conjugated diene monomer having from 4 to 12 carbon atoms;

(b)—any copolymer obtained by copolymerization of one or more conjugated dienes with one another or with one or more vinylaromatic compounds having from 8 to 20 carbon atoms;

(c)—a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;

(d)—a copolymer of isobutene and of isoprene (butyl rubber) and also the halogenated versions, in particular chlorinated or brominated versions, of this type of copolymer.

Although it applies to any type of diene elastomer, a person skilled in the art of tyres will understand that the present invention is preferably employed with essentially unsaturated diene elastomers, in particular of the type (a) or (b) above.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can comprise between 99% and 20% by weight of diene units and between 1% and 80% by weight of vinylaromatic units. The elastomers can have any microstructure, which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or else functionalized with a coupling and/or star-branching or functionalization agent. Mention may be made, for example, for coupling to carbon black, of functional groups comprising a C—Sn bond or aminated functional groups, such as aminobenzophenone, for example; mention may be made, for example, for coupling to a reinforcing inorganic filler, such as silica, of silanol or polysiloxane functional groups having a silanol end (such as described, for example, in FR 2 740 778 or U.S. Pat. No. 6,013,718 and WO 2008/141702), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909 or U.S. Pat. No. 6,503,973, WO 2009/000750 and WO 2009/000752).

Mention may also be made, as functional elastomers, of those prepared by the use of a functional initiator, in particular those bearing an amine or tin functional group (see, for example, WO 2010/072761).

Mention may also be made, as other examples of functionalized elastomers, of elastomers (such as SBR, BR, NR or IR) of the epoxidized type.

The following are suitable: polybutadienes, in particular those having a content (mol %) of 1,2-units of between 4% and 80% or those having a content (mol %) of cis-1,4-units of greater than 80%, polyisoprenes, butadiene/styrene copolymers and in particular those having a Tg (glass transition temperature (Tg, measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers, in particular those having an isoprene content of between 5% and 90% by weight and a Tg of −40° C. to −80° C., or isoprene/styrene copolymers, in particular those having a styrene content of between 5% and 50% by weight and a Tg of between −5° C. and −50° C. In the case of butadiene/styrene/isoprene copolymers, those having a styrene content of between 5% and 50% by weight and more particularly of between 10% and 40%, an isoprene content of between 15% and 60% by weight and more particularly of between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −5° C. and −70° C., are suitable in particular.

To sum up, the diene elastomer or elastomers of the composition according to the invention are preferably selected from the group of the highly unsaturated diene elastomers consisting of polybutadienes (abbreviated to "BRs"), synthetic polyisoprenes (IRs), natural rubber (NR), butadiene copolymers, isoprene copolymers and the mixtures of these elastomers. Such copolymers are more preferably selected from the group consisting of butadiene/styrene copolymers (SBRs), isoprene/butadiene copolymers (BIRs), isoprene/styrene copolymers (SIRs) and isoprene/butadiene/styrene copolymers (SBIRs).

According to a specific embodiment, the diene elastomer is an isoprene elastomer.

"Isoprene elastomer" is understood to mean, in a known way, an isoprene homopolymer or copolymer, in other words a diene elastomer selected from the group consisting of natural rubber (NR), synthetic polyisoprenes (IRs), the various isoprene copolymers and the mixtures of these elastomers. Mention will in particular be made, among isoprene copolymers, of isobutene/isoprene (butyl rubber—IIR), isoprene/styrene (SIR), isoprene/butadiene (BIR) or isoprene/butadiene/styrene (SBIR) copolymers. This isoprene elastomer is preferably natural rubber or a synthetic cis-1,4-polyisoprene; use is preferably made, among these synthetic polyisoprenes, of polyisoprenes having a content (mol %) of cis-1,4-bonds of greater than 90%, more preferably still of greater than 98%.

Advantageously, it consists of natural rubber and is used in a blend with one or more elastomers selected from the group consisting of polybutadienes, synthetic polyisoprenes, butadiene copolymers, isoprene copolymers and the mixtures of these elastomers.

According to an alternative embodiment of the invention, the natural rubber is predominantly (for more than 50 phr) an isoprene elastomer; according to another alternative embodiment, the natural rubber is the only elastomer of the composition.

According to another embodiment of the invention, the diene elastomer consists of an SBR, used predominantly or not, and optionally in a blend with one or more elastomers selected from the group consisting of polybutadienes, synthetic polyisoprenes, butadiene copolymers, isoprene copolymers and the mixtures of these elastomers.

According to an alternative embodiment of the invention, the SBR is the only elastomer of the composition.

The composition according to the invention can comprise just one diene elastomer or a mixture of several diene elastomers, it being possible for the diene elastomer or elastomers to be used in combination with any type of synthetic elastomer other than a diene elastomer, indeed even with polymers other than elastomers, for example thermoplastic polymers.

Reinforcing Inorganic Filler

The term "reinforcing inorganic filler" should be understood here as meaning, in a known way, any inorganic or mineral filler, whatever its colour and its origin (natural or synthetic), also known as "white filler", "clear filler" or also "non-black filler", in contrast to carbon black, this inorganic filler being capable of reinforcing, by itself alone, without means other than an intermediate coupling agent, a rubber composition intended for the manufacture of a tread for tyres, in other words capable of replacing, in its reinforcing role, a conventional tyre-grade carbon black, in particular for a tread; such a filler is generally characterized, in a known way, by the presence of hydroxyl (—OH) groups at its surface.

Preferably, the reinforcing inorganic filler is a filler of the siliceous or aluminous type, or a mixture of these two types of fillers.

The silica ($SiO_2$) used can be any reinforcing silica known to a person skilled in the art, in particular any precipitated or fumed silica exhibiting a BET specific surface and a CTAB specific surface both of less than 450 $m^2/g$, preferably from 30 to 400 $m^2/g$. Highly dispersible precipitated silicas (HDSs) are preferred, in particular when the invention is employed in the manufacture of tyres exhibiting a low rolling resistance; mention may be made, as examples of such silicas, of the Ultrasil 7000 silicas from Evonik, the Zeosil 1165MP, 1135MP, 1115MP and Premium 200MP silicas from Solvay, the Hi-Sil EZ150G silica from PPG or the Zeopol 8715, 8745 and 8755 silicas from Huber.

The reinforcing alumina ($Al_2O_3$) preferably used is a highly dispersible alumina having a BET specific surface ranging from 30 to 400 $m^2/g$, more preferably between 60 and 250 $m^2/g$, and a mean particle size at most equal to 500 nm, more preferably at most equal to 200 nm. Mention may in particular be made, as non-limiting examples of such reinforcing aluminas, of the Baikalox A125 or CR125 alumina (Baïkowski), APA-100RDX alumina (Condea), Aluminoxid C alumina (Evonik) or AKP-G015 alumina (Sumitomo Chemicals).

Mention may also be made, as other examples of inorganic filler capable of being used in the rubber compositions of the treads of the invention, of aluminium (oxide) hydroxides, aluminosilicates, titanium oxides, silicon carbides or nitrides, all of the reinforcing type as described, for example, in Applications WO 99/28376, WO 00/73372, WO 02/053634, WO 2004/003067 and WO 2004/056915.

The physical state in which the reinforcing inorganic filler is provided is not important, whether it is in the form of a powder, of microbeads, of granules, of beads or any other appropriate densified form. Of course, the term "reinforcing inorganic filler" is also understood to mean mixtures of different reinforcing inorganic fillers, in particular of highly dispersible siliceous and/or aluminous fillers as described above.

A person skilled in the art will know how to adjust the content of reinforcing inorganic filler according to the nature of the inorganic filler used and according to the type of tyre concerned, for example tyre for a motorbike, for a passenger vehicle or for a utility vehicle, such as a lorry or heavy-duty vehicle. Preferably, this content of reinforcing inorganic filler will be chosen between 10 and 200 phr, more preferably between 30 and 150 phr, in particular greater than 50 phr, and more preferably still between 60 and 140 phr.

In the present account, the BET specific surface is determined in a known way by gas adsorption using the Brunauer-Emmett-Teller method described in *The Journal of the American Chemical Society*, Vol. 60, page 309, February 1938, more specifically according to French Standard NF ISO 9277 of December 1996 (multipoint (5 point) volumetric method—gas: nitrogen—degassing: 1 hour at 160° C.—relative pressure $p/p_0$ range: 0.05 to 0.17). The CTAB specific surface is the external surface determined according to French Standard NF T 45-007 of November 1987 (method B).

Finally, a person skilled in the art will understand that, as filler equivalent to the reinforcing inorganic filler described in the present section, use might be made of a reinforcing filler of another nature, in particular organic nature, provided that this reinforcing filler is covered with an inorganic layer, such as silica, or else comprises functional sites, in particular hydroxyl sites, at its surface which require the use of a coupling agent in order to establish the bond between the filler and the elastomer. Mention may be made, as examples of such organic fillers, of functionalized polyvinylaromatic organic fillers, such as described in Applications WO 2006/069792 and WO 2006/069793.

The reinforcing inorganic filler can also be used in combination with an organic reinforcing filler, in particular carbon black, for example a black of the HAF, ISAF or SAF type, conventionally used in tyres and in particular in tyre treads (for example, N115, N134, N234, N326, N330, N339, N347 or N375 blacks or also, depending on the applications targeted, blacks of higher series, for example N660, N683 or N772). These carbon blacks can be used in the isolated state, as commercially available, or in any other form, for example as support for some of the rubber additives used. The carbon blacks might, for example, be already incorporated in the elastomer in the form of a masterbatch (see, for example, Applications WO 97/36724 and WO 99/16600).

The amount of carbon black present in the total reinforcing filler can vary within wide limits; it is preferably less than that of the reinforcing inorganic filler. Advantageously, carbon black is used in a very low proportion, with a content of between 2 and 20 phr and preferably at a content of less than 10 phr. Within the intervals indicated, the colouring properties (black pigmenting agent) and UV-stabilizing properties of the carbon blacks are beneficial, without, moreover, adversely affecting the typical performance qualities contributed by the reinforcing inorganic filler. Of course, the composition of the invention itself can be completely devoid of carbon black.

Coupling Agent

The organosilane used as coupling agent according to the invention is a monohydroxysilane polysulfide, of formula (I):

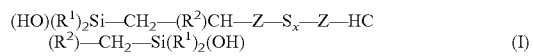

or in the semi-expanded form:

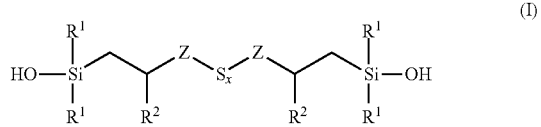

in which:
- R$^1$, which are identical or different, each represent a monovalent hydrocarbon group having from 1 to 18 carbon atoms;
- R$^2$, which are identical or different, each represent a monovalent hydrocarbon group having from 1 to 4 carbon atoms;
- Z, which are identical or different, each represent a divalent hydrocarbon bonding group comprising from 1 to 16 carbon atoms;
- x is an integral or fractional number greater than or equal to 2.

Preferably, the R$^1$ groups are chosen from C$_1$-C$_6$ alkyls, C$_5$-C$_8$ cycloalkyls and the phenyl radical, the Z groups being chosen from C$_1$-C$_{16}$ alkylenes and C$_6$-C$_{12}$ arylenes, and more preferably the R$^1$ groups are chosen from C$_1$-C$_3$ alkyls, the Z groups being chosen from C$_1$-C$_3$ alkylenes.

According to a preferred alternative embodiment of the invention, the polysulfide corresponds to the formula (Me=methyl):

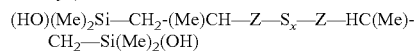

Preferably, the Z groups are chosen from methylene and ethylene.

More preferably still, the polysulfide consists of a bis(2-methylpropane-1,3-diyl)(dimethylsilanol) polysulfide of formula:

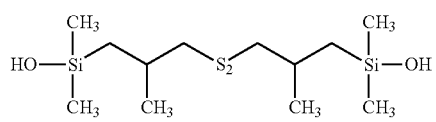

The hydroxysilane polysulfides synthesized are in fact mixtures of polysulfides (par exemple from x=2 to x=9), with as consequence a mean value for x which is different from a whole value. The mean value targeted for x is preferably in a range extending from 2 to 6, more preferably in a range extending from 2 to 4.

The monohydroxysilane polysulfide of formula (I) can be obtained by a process comprising the following stages:
- a hydrosilylation of an alkene of formula R$^2$—C(CH$_2$)Z-Hal by a hydrogensilane of general formula Hal(R$^1$)$_2$Si—H (where Hal=halogen) is carried out (Scheme 1 below) in order to result in a halogenated organosilane (hereinafter product A) of formula:

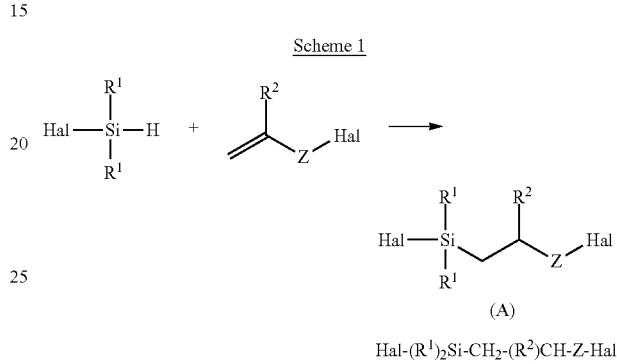

Hal-(R$^1$)$_2$Si-CH$_2$-(R$^2$)CH-Z-Hal with R$^1$, R$^2$ and Z as defined above;
- a hydrolysis is carried out, in an inert organic solvent, by the action of a hydroxyl donor on the product (A), in the presence of an organic or inorganic base, in order to trap the acid halide formed, the hydroxyl donor being water (Scheme 2), in order to obtain a monohydroxysilane (product C) of formula:

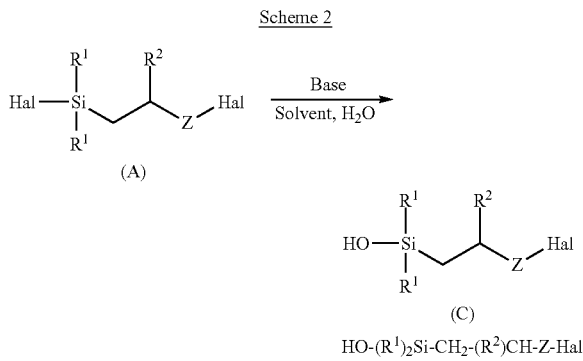

HO-(R$^1$)$_2$Si-CH$_2$-(R$^2$)CH-Z-Hal with R$^1$, R$^2$ and Z as defined above;
Finally, a stage of sulfidation is carried out on the product C (Scheme 3), by the action of a polysulfide, in order to result in the targeted product of formula (I):

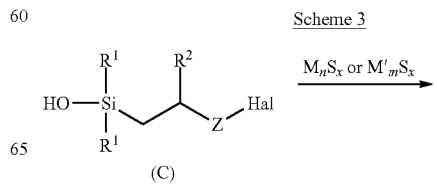

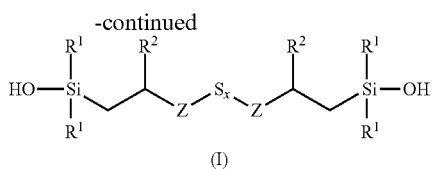

(I)

with $R^1$, $R^2$, Z and x as defined above.

Advantageously, Hal is chlorine.

Preferably, the organic base intended to trap the acid halide formed is a tertiary amine.

According to an alternative embodiment of the process, the hydroxyl donor is used in excess with respect to the amount of product A.

Advantageously, the polysulfide is an ammonium or metal polysulfide (x≥2), of formula $M_nS_x$ or $M'S_x$ (M=alkali metal or $NH_4$; M'=Zn or alkaline earth metal).

Preferably, it is a sodium polysulfide $Na_2S_x$, preferably generated by the action of sulfur on $Na_2S$.

More preferably still, the sulfidation stage is carried out in the aqueous phase or in a two-phase water/organic solvent medium, in the presence of a phase transfer catalyst and of a salt of formula M"Hal or $M"_2SO_4$ (M" chosen from Li, Na and K; Hal chosen from F, Cl and Br).

Advantageously, the amount of monohydroxysilane polysulfide of formula (I) is between 1 and 20 phr.

This coupling agent can be used alone or as a mixture with another coupling agent, the total amount of coupling agent in the composition being between 1 and 20 phr.

Crosslinking System

The crosslinking system is preferably a vulcanization system, that is to say a system based on sulfur (or on a sulfur-donating agent) and on a primary vulcanization accelerator. Additional to this base vulcanization system are various known secondary vulcanization accelerators or vulcanization activators, such as zinc oxide, stearic acid or equivalent compounds, or guanidine derivatives (in particular diphenylguanidine), incorporated during the first non-productive phase and/or during the productive phase, as described subsequently.

The sulfur is used at a preferred content of between 0.5 and 12 phr, especially between 1 and 10 phr. The primary vulcanization accelerator is used at a preferred content of between 0.5 and 10 phr, more preferably of between 0.5 and 5.0 phr.

Use may be made, as (primary or secondary) accelerator, of any compound capable of acting as accelerator for the vulcanization of diene elastomers in the presence of sulfur, in particular accelerators of the thiazole type and also their derivatives, and accelerators of thiuram and zinc dithiocarbamate types. These accelerators are, for example, selected from the group consisting of 2-mercaptobenzothiazyl disulfide (abbreviated to "MBTS"), tetrabenzylthiuram disulfide ("TBZTD"), N-cyclohexyl-2-benzothiazolesulfenamide ("CBS"), N,N-dicyclohexyl-2-benzothiazolesulfenamide ("DCBS"), N-(tert-butyl)-2-b enzothiazolesulfenamide ("TBBS"), N-(tert-butyl)-2-benzothiazolesulfenimide ("TBSP"), zinc dibenzyldithiocarbamate ("ZBEC") and the mixtures of these compounds.

According to a preferred alternative embodiment of the invention, zinc and any zinc derivative, such as ZnO, are excluded among the secondary accelerators or vulcanization activators used or they can be used in accordance with the 0.5 phr maximum of zinc in the composition, and preferably less than 0.3 phr.

Various Additives

The rubber compositions in accordance with the invention can also comprise all or a portion of the normal additives customarily used in elastomer compositions intended for the manufacture of tyres, in particular of treads, such as, for example, plasticizers or extender oils, whether the latter are aromatic or non-aromatic in nature, pigments, protective agents, such as antiozone waxes, chemical antiozonants or antioxidants, anti-fatigue agents, reinforcing resins, methylene acceptors (for example, phenolic novolak resin) or methylene donors (for example, HMT or H3M), such as described, for example, in Application WO 02/10269, a crosslinking system based either on sulfur or on sulfur-donating agents and/or on peroxide and/or on bismaleimides, vulcanization accelerators or vulcanization activators.

In particular, the rubber compositions can comprise plasticizing resins corresponding, by definition in this instance, to compounds which are solid at ambient temperature (23° C.) (in contrast to a liquid plasticizing compound, such as an oil).

Hydrocarbon resins are polymers well known to a person skilled in the art which are miscible by nature in diene elastomer composition(s), when they are additionally described as "plasticizing". They have been described, for example, in the work entitled "Hydrocarbon Resins" by R. Mildenberg, M. Zander and G. Collin (New York, VCH, 1997, ISBN 3-527-28617-9), Chapter 5 of which is devoted to their applications, in particular in the tyre rubber field (5.5"Rubber Tires and Mechanical Goods"). They can be aliphatic, aromatic or else of the aliphatic/aromatic type, that is to say based on aliphatic and/or aromatic monomers. They can be natural or synthetic and are or are not based on petroleum (if such is the case, they are also known under the name of petroleum resins). They are preferably exclusively of hydrocarbon nature, that is to say that they comprise only carbon and hydrogen atoms.

The softening point is measured according to Standard ISO 4625 ("Ring and Ball" method). The glass transition temperature Tg is measured in a known way by DSC (Differential Scanning calorimetry) according to Standard ASTM D3418 (1999). The macrostructure (Mw, Mn and PI) of the hydrocarbon resin is determined by size exclusion chromatography (SEC): solvent tetrahydrofuran; temperature 35° C.; concentration 1 g/l; flow rate 1 ml/min; solution filtered through a filter with a porosity of 0.45 µm before injection; Moore calibration with polystyrene standards; set of 3 Waters columns in series (Styragel HR4E, HR1 and HR0.5); detection by differential refractometer (Waters 2410) and its associated operating software (Waters Empower).

It is known to use, in rubber compositions for tyres, plasticizing hydrocarbon resins having at least any one of the following characteristics:
- a Tg of greater than 20° C., more preferably of greater than 30° C.;
- a number-average molecular weight (Mn) of between 400 and 2000 g/mol;
- a polydispersity index (PI) of less than 4, preferably of less than 3 (as a reminder: PI=Mw/Mn with Mw being the weight-average molecular weight).

More preferably, this plasticizing hydrocarbon resin exhibits all of the preferred characteristics above.

It is also known to use, in rubber compositions for tyres, plasticizing hydrocarbon resins having at least any one of the following characteristics:
- a Tg of between −40° C. and 0° C., more preferably between −30° C. and 0° C. and more preferably still between −20° C. and 0° C.;
- a number-average molecular weight (Mn) of less than 800 g/mol, preferably of less than 600 g/mol and more preferably of less than 400 g/mol;
- a softening point within a range extending from 0° C. to 50° C., preferentially from 0° C. to 40° C., more preferentially from 10° C. to 40° C., preferably from 10° C. to 30° C.;
- a polydispersity index (PI) of less than 3, more preferably of less than 2 (as a reminder: PI=Mw/Mn with Mw being the weight-average molecular weight).

More preferably, this plasticizing hydrocarbon resin of low Tg exhibits all of the preferred characteristics above.

In particular, whatever the type of abovementioned plasticizing resins, it is known to select them from the group consisting of cyclopentadiene (abbreviated to CPD) or dicyclopentadiene (abbreviated to DCPD) homopolymer or copolymer resins, terpene homopolymer or copolymer resins, $C_5$ fraction homopolymer or copolymer resins and the mixtures of these resins.

Preferably, the content of plasticizing resins ranges from 10 to 90 phr.

Inert (i.e., non-reinforcing) fillers, such as particles of clay, bentonite, talc, chalk or kaolin, can also be added to the reinforcing filler described above, as a function of the application targeted, with a content of less than or equal to 10 phr and preferably of less than or equal to 5 phr.

Manufacture of the Rubber Compositions

The rubber compositions of the invention are manufactured in appropriate mixers using two successive preparation phases according to a general procedure well known to a person skilled in the art: a first phase of thermomechanical working or kneading (sometimes described as "non-productive" phase) at high temperature, up to a maximum temperature of between 130° C. and 200° C., preferably between 145° C. and 185° C., followed by a second phase of mechanical working (sometimes described as "productive" phase) at a lower temperature, typically of less than 120° C., for example between 60° C. and 100° C., during which finishing phase the crosslinking or vulcanization system is incorporated.

It is possible to envisage one or more additional stages targeted at preparing masterbatches of elastomer and of reinforcing filler which are intended to be introduced during the first working phase.

The examples which follow make it possible to illustrate the invention; however, the invention cannot be limited to these examples alone.

III. Exemplary Embodiments of the Invention

In the exemplary embodiments which follow, the invention is carried out with a bis(2-methylpropane-1,3-diyl)(dimethylsilanol) polysulfide of formula:

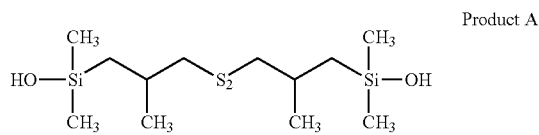

Product A

Synthesis of
bis(2-methylpropane-1,3-diyl)(dimethylsilanol)
Disulfide (Product A)

Stage 1

Heptane is introduced into a reactor (2-litres) with control of temperature, mechanical stirring and refrigerated condensation, in order have the stirring volume. The temperature of the reaction medium is brought to 90° C. Once this temperature has been reached, the Karsted catalyst is added. Immediately after the addition of the catalyst, a premix of dimethylchlorosilane and 3-chloro-2-methylpropene is added to the reaction medium via a dropping funnel. The rate of addition of the premix is adjusted as a function of the exothermicity of the reaction medium and of reflux. The objective is to keep the reflux as low as possible and the reaction temperature between 85° C. and 95° C.

Once the addition has been completed, the reaction medium is stirred at 90° C. (+1-5° C.) for 30 minutes. The heptane and the unreacted starting materials are separated by distillation.

A distillation of the crude reaction product at 80° C. under a pressure of 20 mm of mercury makes it possible to isolate chloro(3-chloro-2-methylpropyl)dimethylsilane with a yield of 97%. The NMR analysis does not show the presence of byproduct.

Stage 2

(3-Chloro-2-methylpropyl)dimethyl silanol is synthesized by hydrolysis of chloro(3-chloro-2-methylpropyl)dimethyl silane in the presence of dimethylethylamine. Two experimental protocols can be applied:
- using ether as solvent (75% by weight of the total amount introduced) with 6 mol of water and 5 mol of dimethylethylamine per one mol of chlorosilane,
- or using toluene as solvent (45% by weight of the total amount introduced) with 3 mol of water and 2 mol of dimethylethylamine per one mol of chlorosilane.

The two protocols are carried out at a temperature of 0° C. The chlorosilane is added dropwise (total duration of addition approximately 4 hours). The aqueous phase is then removed and the organic phase is concentrated under reduced pressure at 30° C.

(3-Chloro-2-methylpropyl)dimethylsilanol is obtained with a quantitative yield. The amount of disiloxane, a byproduct resulting from the condensation of (3-chloro-2-methylpropyl)dimethylsilanol, is between 1 et 3 mol % with respect to the content of silanol.

Stage 3

The dropwise addition, to a two-phase mixture of water, toluene, a phase transfer agent and polysulfide salts which is stirred at between 80° C. and 85° C. for 90 minutes, of (3-chloro-2-methylpropyl)dimethylsilanol in solution in toluene (approximately 15%) is carried out.

The polysulfide salts are preformed by reaction of a mixture of sulfur, sodium chloride and sodium sulfide.

The distribution of sulfur in the final product can be modified by changing the proportion of sulfur with regard to the silanol in this reaction. The proportions used in this instance are 1.33 mol of sulfur per 1 mol of silanol, in order to obtain a mean chain length of x=2 sulfur atoms (product A).

It should be noted here that, in order to carry out the synthesis of a bis(2-methylpropane-1,3-diyl)(dimethylsilanol) tetrasulfide of formula:

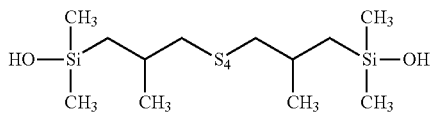

it is sufficient to modify the amount of sulfur introduced.

The amount of sodium sulfide used in molar ratios with respect to the sulfur can thus vary from 5 to 0.5.

The sodium chloride is added in contents of between 2.3 and 4.3 mol of NaCl per each mol of silanol.

The phase transfer agent can be a quaternary salt added immediately before beginning the addition of the silanol. Mention may in particular be made, as quaternary salt, of:
tetrabutylammonium bromide (at least 3 mol %),
tetrabutylammonium chloride (at least 1.6 mol %),
tetrabutylphosphonium chloride (at least 1.6 mol %).

It should be noted that, if these amounts of phase transfer catalysts are increased, then the amount of asymmetric byproducts resulting from the reaction of the butyl groups originating from the catalysts will disadvantageously increase.

The proportions tested extend from 0.8% to 5% of the weight of reactants. The reaction was followed by gas chromatography and regarded as complete when all the silanol was consumed.

The dilution of the product is between 10% and 15% in toluene. The amount of water used in the salts is also within this range of values. The aqueous phase is removed and the product present in the organic phase is concentrated under vacuum at a temperature of less than 35° C.

The final products are characterized by NMR. This shows the amount of asymmetric compounds formed (derived mainly from the reaction of the silanol with the catalyst) and the amount of polycondensed sulfidosilanol.

The content of the asymmetric compounds can be reduced by washing the product with hexane. The asymmetric compounds are preferably soluble in hexane but a portion of the product is also soluble in hexane, which lowers the yield of the reaction.

This product thus consists of a distribution of polysulfides, the mean value of the x indices of which is approximately 2.

Synthesis of the bis(propyldimethylsilanol) (Product B) of Formula

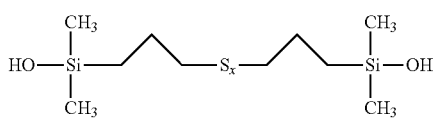

This product is synthesized in accordance with the description of Patent EP 1 326 914, sections [0108] to [0128].

Preparation of the Rubber Compositions

The tests which follow are carried out in the following way: the diene elastomer (or the mixture of diene elastomers, if appropriate), the reinforcing filler, the coupling agent and then the various other ingredients, with the exception of the vulcanization system, are introduced into an internal mixer which is 70% filled and which has an initial vessel temperature of approximately 60° C. Thermomechanical working is then carried out (non-productive phase) in one or two stages (total duration of the kneading equal to approximately 7 min), until a maximum "dropping" temperature of approximately 165° C. is reached. The mixture thus obtained is recovered and cooled and then sulfur and sulfenamide accelerator are added on an external mixer (homofinisher) at 30° C., everything being mixed (productive phase) for 3 to 4 minutes.

The compositions thus obtained are subsequently calendered in the form of plaques (thickness of 2 to 3 mm) or of thin sheets of rubber, for the measurement of their physical or mechanical properties, or extruded in order to form profiled elements which can be used directly, after cutting and/or assembling to the desired dimensions, for example as semi-finished products for tyres, in particular as tyre treads.

Test 1

The aim of this test is to demonstrate the improved performance qualities of a composition in accordance with the invention, compared with a conventional composition using TESPT and also with a composition using a coupling agent in accordance with the document EP 1 326 914.

Three compositions in accordance with the process explained in the preceding section, based on SBR, reinforced predominantly with silica, are thus prepared, which compositions differ from one another in the nature of the coupling agent, these coupling agents being used in an isomolar silicon content, as follows:
the conventional control composition C1, not in accordance with the invention, comprises TESPT as coupling agent,
the control composition C2, not in accordance with the invention, comprises product B as coupling agent,
the composition C3, in accordance with the invention, comprises product A as coupling agent.

It should be remembered that TESPT is bis(3-triethoxysilylpropyl) tetrasulfide, of formula $[(C_2H_5O)_3Si(CH_2)_3S_2]_2$; it is sold, for example, by Evonik under the name "Si69" (or "X50S" when it is supported at 50% by weight on carbon black) or also by Witco under the name "Silquest A1289" (in both cases, commercial mixture of polysulfides $S_x$ with a mean value for x which is approximately 4).

The expanded formula for TESPT is:

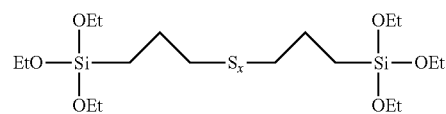

The formulation of the three compositions (contents of the various products expressed in phr) and their properties after curing (approximately 30 min at 150° C.) are given in Tables 1 and 2 respectively.

In the light of Table 2, it is found, surprisingly, that the composition C3 in accordance with the invention exhibits stiffness properties which are significantly improved in comparison with the two control compositions C1 and C2 at all the strains and also breaking stress properties which are markedly improved in comparison with the conventional control composition C1 and identical to the composition C2.

TABLE 1

| | Compositions | | |
|---|---|---|---|
| | C1 | C2 | C3 |
| SBR (1) | 100 | 100 | 100 |
| Carbon black (2) | 4 | 4 | 4 |
| Silica (3) | 110 | 110 | 110 |
| Silane (4) | 8.8 | — | — |
| Silane (5) | — | 6.5 | — |
| Silane (6) | — | — | 7.1 |
| Resin (7) | 45 | 45 | 45 |
| Oil (8) | 17 | 17 | 17 |
| Wax | 1.8 | 1.8 | 1.8 |
| DPG (9) | 2 | 2 | 2 |
| ZnO | 1 | 1 | 1 |
| Stearic acid | 2 | 2 | 2 |
| Antioxidant (10) | 2.7 | 2.7 | 2.7 |
| Sulfur* | 1.1 | 1.1 | 1.8 |
| Accelerator (11) | 2.3 | 2.3 | 2.3 |

(1) SBR with 27% of styrene units and 24% of 1,2- units of the butadiene part (Tg = −48° C.) bearing a silanol functional group at the end of the elastomer chain, and comprising, in a minor proportion by weight, chains of the same microstructure but Sn star-branched;
(2) Carbon black N234, sold by Cabot Corporation;
(3) "HD"-type silica, Zeosil 1165MP from Solvay;
(4) TESPT (Si69 from Evonik);
(5) Product B (bis(propyldimethylsilanol) at 90 mol %;
(6) Product A (bis(2-methylpropane-1,3-diyl)(dimethylsilanol) at 77 mol %;
(7) C₅/C₉ Fraction resin (Resine THER 8644 from Cray Valley);
(8) Sunflower oil, Lubrirob Tod 1880 from Novance;
(9) Diphenylguanidine (Vulkacit D from Bayer);
(10) N-(1,3-Dimethylbutyl)-N'-phenyl-para-phenylenediamine (Santoflex 6-PPD from Flexsys);
(11) N-Cyclohexyl-2-benzothiazolesulfenamide (Santocure CBS from Flexsys).
*The sulfur contents were adjusted in order to take into account the release of sulfur which takes place with TESPT and product B (polysulfide $S_4$) and not with product A (disulfide $S_2$).

TABLE 2

| | Compositions | | |
|---|---|---|---|
| | C1 | C2 | C3 |
| M10 (MPa) | 4.0 | 4.2 | 4.6 |
| M100 (MPa) | 1.6 | 1.6 | 1.9 |
| M300 (MPa) | 2.8 | 2.6 | 3.0 |
| Breaking stress (MPa) | 20.2 | 21.2 | 21.2 |

Test 2

The aim of this test is to demonstrate the improved performance qualities of a composition in accordance with the invention not comprising ZnO, compared with a composition using a coupling agent in accordance with the document EP 1 326 914 not comprising ZnO.

Four compositions in accordance with the process explained above, based on SBR, reinforced predominantly with silica, are thus prepared, which compositions differ from one another in the nature of the coupling agent, these coupling agents being used in an isomolar silicon content, as follows:

the control composition C2, not in accordance with the invention, is that of Test 1, comprising product B as coupling agent, the composition C'2, not in accordance with the invention, is identical to the composition C2 except for the fact that it does not comprise zinc oxide, the composition C3, in accordance with the invention, is that of Test 1, comprising product A as coupling agent, the composition C'3, in accordance with the invention, is identical to the composition C3 except for the fact that it does not comprise zinc oxide.

The formulation of the four compositions (contents of the various products expressed in phr) and their properties after curing (approximately 30 min at 150° C.) are given in Tables 3 and 4 respectively.

In the light of Table 4, it is found, surprisingly, that the suppression of zinc oxide in the composition C'3 in accordance with the invention, in comparison with the composition C3, results in an improvement in the stiffness properties (increase in the M100 and M300 moduli) and also in the reinforcing (M300/M100), whereas this suppression on a control composition not in accordance with the invention C'2 results, in comparison with the composition C2, on the contrary, in a significant deterioration in the stiffness with a substantially equivalent reinforcing.

TABLE 3

| | Compositions | | | |
|---|---|---|---|---|
| | C2 | C'2 | C3 | C'3 |
| SBR (1) | 100 | 100 | 100 | 100 |
| Carbon black (2) | 4 | 4 | 4 | 4 |
| Silica (3) | 110 | 110 | 110 | 110 |
| Silane (5) | 6.5 | 6.5 | — | — |
| Silane (6) | — | — | 7.1 | 7.1 |
| Resin (7) | 45 | 45 | 45 | 45 |
| Oil (8) | 17 | 17 | 17 | 17 |
| Wax | 1.8 | 1.8 | 1.8 | 1.8 |
| DPG (9) | 2 | — | 2 | — |
| ZnO | 1 | — | 1 | — |
| Stearic acid | 2 | 2 | 2 | 2 |
| Antioxidant (10) | 2.7 | 2.7 | 2.7 | 2.7 |
| Sulfur | 1.1 | 1.1 | 1.8 | 1.8 |
| Accelerator (11) | 2.3 | 2.3 | 2.3 | 2.3 |

TABLE 4

| | Compositions | | | |
|---|---|---|---|---|
| | C2 | C'2 | C3 | C'3 |
| M100 (MPa) | 1.6 | 1.5 | 1.9 | 2.0 |
| M300 (MPa) | 2.4 | 2.1 | 3.0 | 3.5 |
| M300/M100 | 1.5 | 1.4 | 1.5 | 1.8 |

The invention claimed is:

1. An elastomeric composition based on at least:
   a diene elastomer,
   an inorganic filler as reinforcing filler; and
   a monohydroxysilane polysulfide as coupling agent of formula (I):

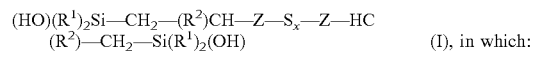

(I), in which:

each $R^1$ represent a monovalent hydrocarbon group having from 1 to 18 carbon atoms and can be the same or different from one another,
   each $R^2$ represents a monovalent hydrocarbon group having from 1 to 4 carbon atoms and can be the same or different from one another,
   each Z represents a divalent hydrocarbon bonding group comprising from 1 to 16 carbon atoms and can be the same or different from one another, and
   x is an integral or fractional number greater than or equal to 2.

2. The elastomeric composition according to claim 1, wherein $R^1$ is selected from the group consisting of $C_1$-$C_6$ alkyls, $C_5$-$C_8$ cycloalkyls and the phenyl radical, and wherein Z is selected from the group consisting of $C_1$-$C_{16}$ alkylenes and $C_6$-$C_{12}$ arylenes.

3. The elastomeric composition according claim 2, wherein $R^1$ is selected from the group consisting of $C_1$-$C_3$ alkyls, and
wherein Z is selected from the group consisting of $C_1$-$C_3$ alkylenes.

4. The elastomeric composition according to claim 3, wherein the monohydroxysilane polysulfide corresponds to the following, where Me is methyl:

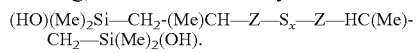
(HO)(Me)$_2$Si—CH$_2$-(Me)CH—Z—S$_x$—Z—HC(Me)-CH$_2$—Si(Me)$_2$(OH).

5. The elastomeric composition according to claim 3, wherein Z is methylene or ethylene.

6. The elastomeric composition according to claim 5, wherein the coupling agent consists of a bis(2-methylpropane-1,3-diyl)(dimethylsilanol) polysulfide.

7. The elastomeric composition according to claim 1, wherein x is within a range extending from 2 to 4.

8. The elastomeric composition according to claim 1, wherein the diene elastomer is selected from the group consisting of polybutadienes, natural rubber, synthetic polyisoprenes, butadiene copolymers, isoprene copolymers and mixtures thereof.

9. The elastomeric composition according to claim 8, wherein the diene elastomer is selected from the group consisting of butadiene/styrene copolymers, butadiene/isoprene copolymers, isoprene/styrene copolymers, butadiene/acrylonitrile copolymers, butadiene/styrene/isoprene copolymers and mixtures thereof.

10. The elastomeric composition according to claim 1, wherein a content of reinforcing inorganic filler is between 10 and 200 phr, phr being parts by weight per hundred of elastomer.

11. The elastomeric composition according to claim 10, wherein the content of reinforcing inorganic filler is between 30 and 150 phr.

12. The elastomeric composition according to claim 1, wherein an amount of monohydroxysilane polysulfide of formula (I) is between 1 and 20 phr, phr being parts by weight per hundred of elastomer.

13. The elastomeric composition according to claim 1 further comprising carbon black.

14. The elastomeric composition according to claim 13, wherein the carbon black is present at a content of between 2 and 20 phr, phr being parts by weight per hundred of elastomer.

15. The elastomeric composition according to claim 1, wherein a content of zinc is less than or equal to 0.5 phr.

16. A tread comprising a rubber composition according to claim 1.

17. A finished or semi-finished article comprising a rubber composition according to claim 1.

18. A tire comprising a rubber composition according to claim 1.

* * * * *